(12) United States Patent
Yun (10) Patent No.: US 10,411,309 B2
(45) Date of Patent: Sep. 10, 2019

(54) BATTERY MODULE HAVING SENSING CONNECTOR FIXING STRUCTURE

(71) Applicant: LG Chem, Ltd., Seoul (KR)

(72) Inventor: Young-Sun Yun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/820,504

(22) Filed: Nov. 22, 2017

(65) Prior Publication Data

US 2018/0151921 A1    May 31, 2018

(30) Foreign Application Priority Data

Nov. 29, 2016  (KR) .......................... 10-2016-0160769

(51) Int. Cl.
| | |
|---|---|
| *H01M 10/48* | (2006.01) |
| *H01M 2/24* | (2006.01) |
| *H01M 2/02* | (2006.01) |
| *H01M 2/10* | (2006.01) |
| *H01M 2/20* | (2006.01) |

(52) U.S. Cl.
CPC ........... *H01M 10/482* (2013.01); *H01M 2/02* (2013.01); *H01M 2/1077* (2013.01); *H01M 2/206* (2013.01); *H01M 2/24* (2013.01)

(58) Field of Classification Search
CPC .............................. H01M 10/482; H01M 2/24
See application file for complete search history.

(56) References Cited

U.S. PATENT DOCUMENTS

| | | | | |
|---|---|---|---|---|
| 2006/0093908 A1* | 5/2006 | Hwang | ............... | H01M 2/0257 429/185 |
| 2011/0195285 A1* | 8/2011 | Shin | ........................ | H01M 2/22 429/93 |
| 2012/0315522 A1* | 12/2012 | Shin | .................... | H01M 2/1077 429/92 |

FOREIGN PATENT DOCUMENTS

| | | | | | |
|---|---|---|---|---|---|
| JP | 2016100211 | A | * | 5/2016 | ............. H01G 11/10 |
| KR | 20120139125 | A | * | 12/2012 | ............... H02G 3/36 |
| KR | 10-2014-0084724 | A | | 7/2014 | |
| KR | 20160023377 | A | * | 3/2016 | ............. H01M 2/34 |
| KR | 20160082075 | A | * | 7/2016 | ............. H01M 2/34 |

* cited by examiner

*Primary Examiner* — Jonathan G Jelsma (74) *Attorney, Agent, or Firm* — Morgan, Lewis & Bockius LLP (57) ABSTRACT

A battery module including a cell assembly having a plurality of battery cells arranged to be stacked on each other; a lower housing having a lower plate provided in a plate form and two vertical plates extending vertically on the lower plate with a predetermined interval, the cell assembly being at least partially inserted into a space between the two vertical plates, so that a plurality of bus bars electrically connected to electrode tabs respectively provided at the battery cells are coupled to the vertical plates; an upper housing coupled to the lower housing to surround an upper portion of the cell assembly; and a sensing unit having a harness wire electrically connected to the plurality of bus bars and provided from a lower portion of the lower housing to an upper portion thereof and a sensing connector connected to an end of the harness wire.

13 Claims, 11 Drawing Sheets

BATTERY MODULE HAVING SENSING CONNECTOR FIXING STRUCTURE

TECHNICAL FIELD

The present application claims priority to Korean Patent Application No. 10-2016-0160769 filed on Nov. 29, 2016 in the Republic of Korea, the disclosures of which are incorporated herein by reference.

The present disclosure relates to a battery module, and more particularly, to a battery module having a sensing connector fixing structure which may temporarily fix a sensing connector for collecting voltage information of an individual battery cell during a battery module assembling process and finally fix the sensing connector after the assembling process.

BACKGROUND ART

Recently, a secondary battery capable of charging and discharging has been widely used as an energy source for wireless mobile devices. Also, the secondary battery is attracting attention as a power source for electric vehicles (EVs) and hybrid electric vehicles (HEVs), which are proposed as solutions for air pollution of existing gasoline vehicles and diesel vehicles using fossil fuels.

In small mobile devices, one or a few battery cells are used per device, but middle-sized or large-sized devices such as automobiles uses a middle-sized or large-sized battery module in which a plurality of battery cells are electrically connected, due to the need for high power large capacity, or uses a battery pack in which a plurality of battery modules are connected.

The middle-sized or large-sized battery module is preferably manufactured in a small size and weight, and thus rectangular batteries or pouch-type batteries which may be stacked with a high degree of integration and have a small weight compared with the capacity are frequently used as battery cells applied to the middle-sized or large-sized battery module.

Also, in order for the middle-sized or large-sized battery module to provide the output and capacity demanded for a device or instrument, a plurality of battery cells should be electrically connected in series, in parallel, or both in series and in parallel, and a stable structure should be maintained against external force.

Since the middle-sized or large-sized battery module is composed of a combination of a plurality of battery cells, if over-voltage, over-current or over-heating occurs at some battery cells, a sensing unit should be essentially provided to sense and control the same.

For example, the battery cells in the battery module may be electrically connected in series, in parallel, or both in series and in parallel, by welding their electrode tabs to a plurality of bus bars provided in a metal plate form. In addition, the sensing unit may include a sensing member connected to the plurality of bus bars in a snap-fit manner, a wire connected to each sensing member, and a sensing connector. The sensing unit may be individually connected to the battery cells to provide voltage/current information of the battery cells to a battery management system (BMS) or the like.

Meanwhile, the sensing connector may be connected to a connection socket provided on a BMS board as a counterpart or may be connected to a male connector. Here, the other side of the male connector may be connected to the connection socket on the BMS board. However, the sensing connector is hung on the end of the flexible wire before the battery module and all electrical components including the BMS are assembled, which interferes with assembling of the product.

For example, a housing of the battery module may be configured so that several parts may be assembled thereto, but the wire and sensing connector move during the assembling process, which makes it very inconvenient to assemble the parts. In addition, after the battery cells are received in the housing, while the electrode tabs of the battery cells are welded to the bus bars, the positions of the wire and the sensing connector may interfere with the welding, which may cause welding failure. In addition, after the battery module is completely assembled, wires and sensing connectors not fixed at specific positions are aesthetically not agreeable, and the wires may become tangled. In this case, it may be troublesome to connect the sensing connector to a counterpart.

RELATED LITERATURES

Patent Literature (Patent Literature 1) Korean Unexamined Patent Publication No. 10-2014-0084724 (Jul. 7, 2014), HL GreenPower

DISCLOSURE

Technical Problem

The present disclosure is designed to solve the problems of the related art, and therefore the present disclosure is directed to providing a battery module, which may give convenience in assembling the battery module and connecting a sensing connector to a counterpart by providing a temporary sensing connector fixing structure for temporarily fixing the sensing connector while components of the battery module are being assembled and a sensing connector fixing structure for finally fixing the sensing connector after the assembling process.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a cell assembly having a plurality of battery cells arranged to be stacked on each other; a lower housing having a lower plate provided in a plate form and two vertical plates extending vertically on the lower plate with a predetermined interval, the cell assembly being at least partially inserted into a space between the two vertical plates, so that a plurality of bus bars electrically connected to electrode tabs respectively provided at the battery cells are coupled to the vertical plates; an upper housing coupled to the lower housing to surround an upper portion of the cell assembly; and a sensing unit having a harness wire electrically connected to the plurality of bus bars and provided from a lower portion of the lower housing to an upper portion thereof and a sensing connector connected to an end of the harness wire and fixed at one side of the lower housing, the sensing unit being configured to sense a voltage characteristic of the battery cells.

The vertical plate may include: an upper vertical plate prepared so that the plurality of bus bars are capable of being coupled to an outer surface thereof; and a lower vertical plate having an empty space therein and configured to extend downwards while protruding outwards in comparison to the upper vertical plate to form a step with respect to the upper vertical plate.

Any one of the two vertical plates may have a temporary connector fixing unit capable of temporarily fixing the sensing connector to the lower vertical plate.

The temporary connector fixing unit may be formed by partially cutting the lower vertical plate into a predetermined shape in a lower direction from a top of the lower vertical plate, and the sensing connector may include: a body coupled to the end of the harness wire; and a fixing hook coupled to an outer surface of the body and configured to be fixedly hooked to an inner side of the temporary connector fixing unit or be released therefrom by rotating the body at a predetermined angle so as to be mounted to the temporary connector fixing unit in a vertical direction.

The temporary connector fixing unit may include a lower end portion having a curved region of an arc form and both side surfaces respectively having hooking protrusions protruding in a lateral direction toward the space formed by cutting, and the fixing hook may include a hook body configured to protrude vertically with respect to the outer surface of the body and having a plate form with a predetermined thickness and a wing portion provided in a wing form at an end of the hook body to spread toward the body while crossing the hook body, wherein the hook body stands between the hooking protrusions so that in a state where the hook body is inserted into the temporary connector fixing unit in a vertical direction, the hook body is laid by rotating along the curved region by 90 degrees to be restrained by the hooking protrusions in a vertical direction and restrained in a front and rear direction by the wing portion.

The lower housing may further include a vertical plate cover configured to cover the upper vertical plate and shield the plurality of bus bars.

The vertical plate cover may include a connector fixing portion to which the sensing connector is fixedly mounted.

The connector fixing portion may have an insert hole formed at one side of the vertical plate cover in a predetermined form, the sensing connector may include: a body having a plurality of connector pins therein and prepared to be capable of being coupled to the end of the harness wire; and a fixing hook having a hook body configured to protrude vertically with respect to an outer surface of the body and having a plate form with a predetermined thickness, and a wing portion provided in a wing form at an end of the hook body to spread toward the body while crossing the hook body, and the wing portion may be folded and pass through the insert hole and then be spread again after passing through the insert hole, so that the fixing hook is fixed to the vertical plate cover.

The connector fixing portion may further include a connector body holder configured to protrude on an outer surface of the vertical plate cover and provided so that the body of the sensing connector is fit into a space therebetween with the insert hole being placed at the center.

The vertical plate cover may further include a wire holder into which the harness wire is fit at a lower portion of the connector fixing portion.

A fragment anti-scattering sheet may be further attached to an inner surface of the vertical plate cover.

In another aspect of the present disclosure, there is also provided a battery pack, which includes the battery module described above.

Advantageous Effects

According to an embodiment of the present disclosure, since the sensing connector may be temporarily fixed while the battery module is being assembled, it is possible to ensure sufficient convenience and stability in welding electrode tabs of the battery cells and assembling a lower housing and an upper housing.

According to another embodiment of the present disclosure, since the sensing connector is finally fixed to one side of the lower housing, the sensing connector may be connected to a counterpart (a male connector) stably and very easily, and the harness wires may be handled neatly and cleanly.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Since the embodiments disclosed herein are provided for more perfect explanation of the present disclosure, the shape, size and the like of components may be exaggerated, omitted or simplified in the drawings for better understanding. Thus, the size and ratio of components in the drawings do not wholly reflect the actual size and ratio.

Figure 1:
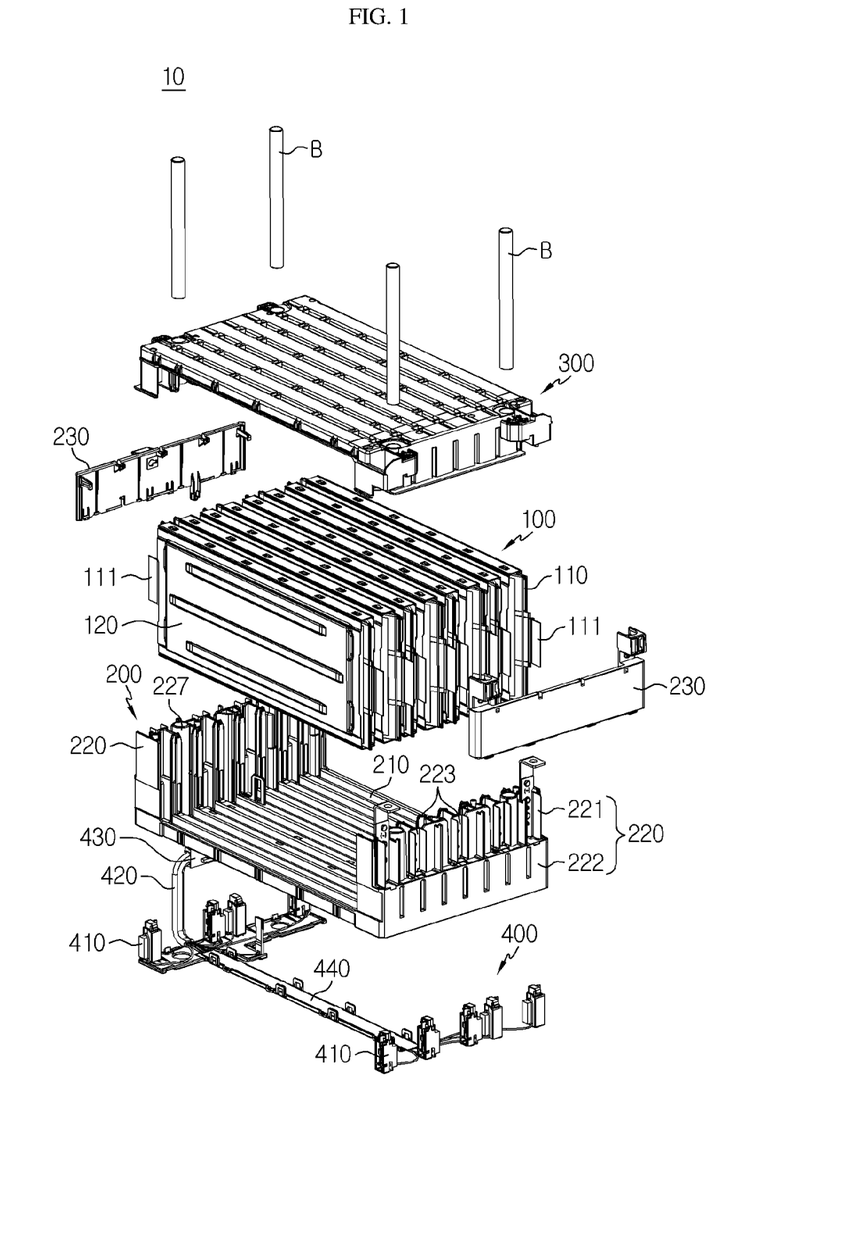
FIG. 1 is a schematic exploded perspective view showing a battery module according to an embodiment of the present disclosure.
Figure 2:
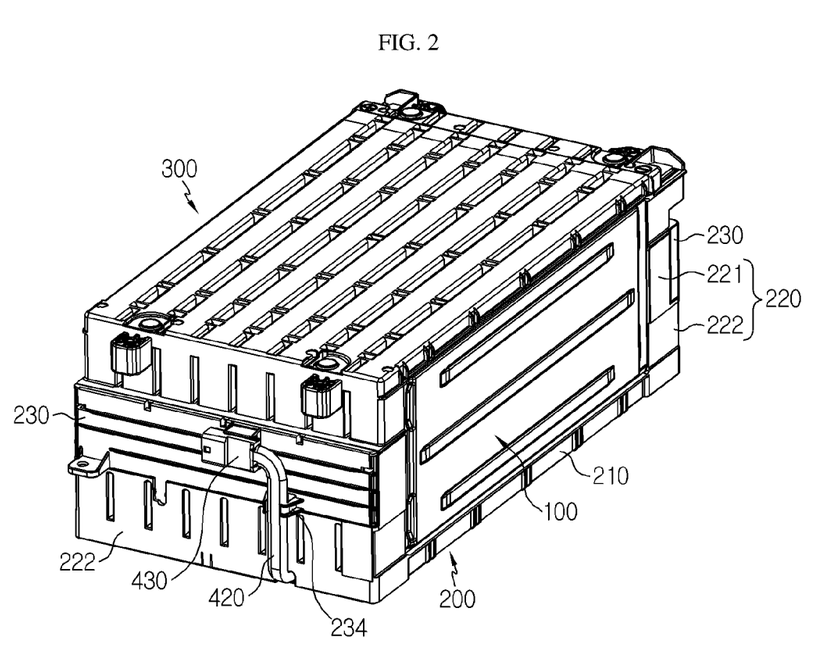
FIG. 2 is a perspective view showing the battery module of FIG. 1 in an assembled state.

FIG. 1 is a schematic exploded perspective view showing a battery module according to an embodiment of the present disclosure, and FIG. 2 is a perspective view showing the battery module of FIG. 1 in an assembled state.

Referring to FIGS. 1 and 2, a battery module 10 according to an embodiment of the present disclosure includes a cell assembly 100, a lower housing 200, an upper housing 300 and a sensing unit 400.

First, the cell assembly 100 of the battery module 10 is explained briefly. The cell assembly 100 may be an aggregation of a plurality of battery cells 110. Here, the battery cell 110 may be a pouch-type secondary battery. The pouch-type secondary battery may include an electrode assembly, an electrolyte and a pouch exterior.

In particular, the pouch exterior may be composed of two pouches, any one of which may have a concave inner space. Also, an electrode assembly may be accommodated in the inner space of the pouch. Sealing portions are provided at outer circumferences of two pouches so that the sealing portions are fused to each other, thereby sealing the inner space in which the electrode assembly is accommodated. An electrode tab 111 may be attached to the electrode assembly, and the electrode tab 111 may be interposed between the sealing portions of the pouch exterior to expose out of the pouch exterior, thereby serving as an electrode terminal of the secondary battery.

As shown in FIG. 1, the battery cells 110 may be arranged to be stacked in a lateral direction while standing in a vertical direction with respect to the ground. Hereinafter, both sides where the electrode tabs 111 are located as shown in FIG. 1 will be called a front surface portion and a rear surface portion of the battery module 10, respectively, and the side where a sensing connector 430 and a harness wire 420 are provided as shown in FIG. 2 will be called a rear surface portion of the battery module 10.

The cell assembly 100 is used for stacking pouch-type secondary batteries and may further include a cartridge 120. The cartridge 120 holds the pouch-type secondary battery to prevent its movement and is configured to be stacked on another cartridge to play a role of guiding assembly of the secondary batteries. The cartridges 120 may be arranged to be stacked in a lateral direction while standing in a vertical direction with respect to the ground in a state of accommodating the battery cells 110. The cartridges 120 may also be stacked in another direction, different from the drawings, and the scope of the present disclosure is not limited to the configurations depicted in the drawings.

The lower housing 200 is disposed below the cell assembly 100 to support the cell assembly 100 from the below. In particular, the cell assembly 100 may be slidably disposed at the inside of the lower housing 200 according to the present disclosure, and the lower housing 200 is configured so that the sensing connector 430 may be fixed to an upper portion thereof.

As shown in FIGS. 1 and 2, the lower housing 200 may include a lower plate 210 having a broad plate form, two vertical plates 220 extending vertically on the lower plate 210 with a predetermined interval, and a vertical plate cover 230 covering a part of the vertical plates 220.

A plurality of slots may be formed in a lateral direction at the upper surface of the lower plate 210. Also, two vertical plates 220 are provided in a plate form to stand upright to face each other at both side portions of a short side of the lower plate, and a plurality of barriers may be formed in a lateral direction at the inner side thereof. Each of the cartridges 120 provided at the cell assembly 100 slides in a vertical direction along the barriers provided at the two vertical plates 220 so that its lower end portion is inserted into the slots, thereby standing upright at the lower housing 200. In other words, the cell assembly 100 may be at least partially inserted into the space between the two vertical plates 220 in a vertical direction to be placed on the lower plate 210.

Meanwhile, the vertical plate 220 may be composed of an upper vertical plate 221 and a lower vertical plate 222. The upper vertical plate 221 is a part of the vertical plate 220 corresponding to a location of the electrode tab 111 when the battery cell 110 is placed to stand on a lower plate of the lower housing 200. Also, by coupling a bus bar 223 to an outer surface of the upper vertical plate 221, the electrode tab 111 may be easily attached to the bus bar 223 later. For reference, the upper vertical plate 221 is formed to have a partially cut portion in a vertical direction so that the electrode tabs 111 may be taken from the inner side of the upper vertical plate 221 to the outer side thereof. The electrode tabs 111 may be attached to the bus bar 223 by welding at the outer side of the upper vertical plate 221.

The lower vertical plate 222 forms a step with respect to the upper vertical plate 221 and corresponds to a part of the vertical plate 220 extending in a lower direction. For example, the lower vertical plate 222 protrudes outwards in comparison to the upper vertical plate 221 and may have an empty space therein. In addition, though not shown in the figures, a hole may be formed in the lower surface of the lower vertical plate 222 in a vertical direction, and a sensing member 410, explained later, may be located in the lower vertical plate 222 and connected to the bus bar 223 through the hole.

The vertical plate cover 230 covers the upper vertical plate 221 of the vertical plate 220 so that the electrode tab 111 and the bus bar 223 are not exposed out. A fragment anti-scattering sheet 238 may be further attached to the inner surface of the vertical plate cover 230 (see FIG. 14). For example, the fragment anti-scattering sheet 238 may be made of a synthetic resin such as a polyethylene (PE) film. The fragment anti-scattering sheet 238 is not easily torn and thus prevents fragments are scattered even though the vertical plate cover 230 is broken due to an external impact applied thereto. In this case, at least a portion where the electrode tab 111 and the bus bar 223 are welded may not be exposed out. For reference, if the bus bar 223 is directly exposed out, metal articles or impurities may make direct contact thereto, which may increase the risk of firing caused by sparks. Meanwhile, a fixing portion 231 for fixing the sensing connector 430 may be further formed at the vertical plate cover 230. This will be explained later in detail.

The upper housing 300 is a plate-shaped structure disposed above the cell assembly 100 to support the cell assembly 100 from the above. The lower housing 200 and the upper housing 300 may be complementarily coupled to surround the periphery of the cell assembly 100. The lower housing 200 and the upper housing 300 may give a mechanical supporting force to the cell assembly 100 and protect the cell assembly 100 against external impacts.

In this embodiment, the lower housing 200 and the upper housing 300 may be vertically fixed by means of long bolts (not shown). For example, a bushing passage hole and a bushing insert tube 227 may be further provided at each corner of the lower housing 200 and the upper housing 300, respectively, so that a bushing B may vertically pass therethrough. The bushing passage hole and the bushing insert tube 227 may communicate with each other in a vertical direction. The bushing B having an elongated cylindrical shape is inserted into the bushing passage hole and the bushing insert tube 227, and then a long bolt is inserted into the bushing B, and then a lower end portion of the long bolt is fastened by a nut at the lower portion of the lower housing 200. As described above, the lower housing 200 and the upper housing 300 may be coupled and fixed by using the bushing B and the long bolt to improve the impact resistance at the bolting portion.

The sensing unit 400 is a component playing a role of providing individual voltage information of the battery cells 110 to a BMS or the like. The sensing unit 400 of this embodiment may include a plurality of sensing members 410, a harness wire 420, a sensing connector 430 and a wire mold 440. The sensing unit 400 may not include the sensing member 410 and the wire mold 440, different from this embodiment, as long as the sensing unit 400 can be directly or indirectly connected to the electrode tab 111 of the battery cells 110.

Referring to FIG. 1 again, the plurality of sensing members 410 may be conductors which are connected to the plurality of bus bars 223 of two upper vertical plates 221 in one-to-one relation. For example, in this embodiment, five bus bars 223 are provided at a front surface portion of the battery module 10 and four bus bars 223 are provided at a rear surface portion of the battery module 10, and thus five sensing members 410 are provided at the front surface portion of the battery module 10 and four sensing members 410 are provided at the rear surface portion of the battery module 10. The plurality of sensing members 410 may pass through the holes (not shown) of the lower vertical plate 222 and be located at the empty space in the lower vertical plate 222 to make direct contact with the corresponding bus bars 223.

Individual wires of the harness wire 420 are selectively connected to the plurality of sensing members 410 one by one to be electrically connected to the plurality of bus bars 223 indirectly. Also, the harness wire 420 may be disposed from a lower portion of the lower housing 200 to an upper portion thereof.

For example, in this embodiment, individual wires of the harness wire 420 are molded in a wire mold 440 and disposed at the lower portion of the lower housing 200 and are also surrounded by a sheath and arranged from a lower portion of the vertical plate 220 at the rear surface portion of the lower housing 200 to an upper portion thereof. In addition, the sensing connector 430 is connected to an end of the harness wire 420. The wire mold 440 may be mounted to the lower plate 210 of the lower housing 200 by snap-fitting.

The sensing connector 430 may be connected to a connection socket (not shown), prepared on a BMS as a counterpart, or a male connector (not shown). The other side of the male connector may be connected to the connection socket on the BMS board. For example, in this embodiment, the sensing connector 430 may be implemented as a female connector, and a male connector connectable to a BMS board may be connected to the sensing connector 430 in a receptacle manner.

Hereinafter, a structure for mounting and fixing the sensing connector 430 will be described in detail. In the battery module 10 according to the present disclosure, the structure for mounting and fixing the sensing connector 430 is provided at two places. In other words, in the battery module 10 according to the present disclosure, a temporary connector fixing unit 224 for temporarily fixing the sensing connector 430 while the battery module 10 is being assembled and a connector fixing portion 231 for finally fixing the sensing connector 430 after the battery module 10 is assembled may be provided.

Prior to detailed explanation, an assembling order of the battery module 10 according to the present disclosure will be described briefly. First, the lower housing 200 and the sensing unit 400 are assembled. After that, the cell assembly 100 is inserted into the lower housing 200 in a vertical direction, and the electrode tabs 111 is welded to the bus bar 223. After that, the upper portion of the cell assembly 100 is covered by the upper housing 300, and the upper housing 300 and the lower housing 200 are coupled by using a long bolt. Finally, the vertical plate cover 230 is assembled, and the sensing connector 430 is mounted to the connector fixing portion 231 provided at the vertical plate cover 230.

In the assembling order as above, after the lower housing 200 and the sensing unit 400 are assembled, the sensing connector 430 may be temporarily fixed to the vertical plate 220 of the lower housing 200 and then the assembling process may be performed further. (The vertical plate 220 and the vertical plate cover 230 mentioned below are limited to the vertical plate 220 and the vertical plate cover 230 located at the rear surface portion of the battery module 10.)

For this, the temporary connector fixing unit 224 for temporarily fixing the sensing connector 430 may be further provided at the vertical plate 220.

Figure 3:
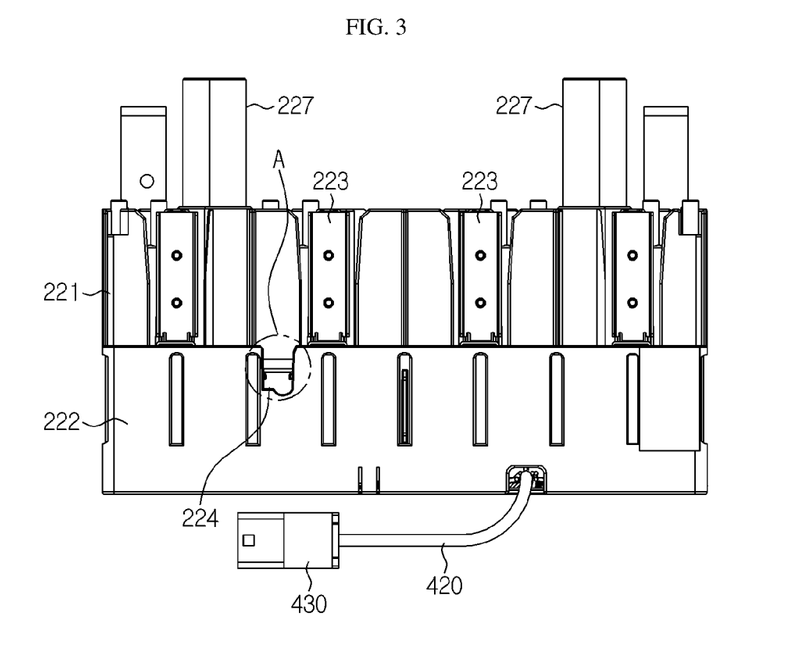
FIGS. 3 to 5 are diagrams showing states before and after a sensing connector is mounted to a rear-side vertical plate of the lower housing according to an embodiment of the present disclosure.
Figure 4:
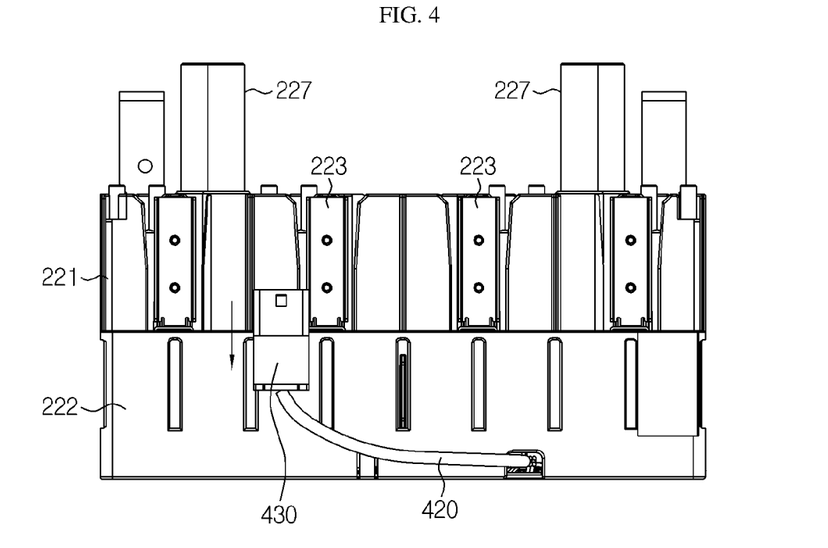
Figure 5:
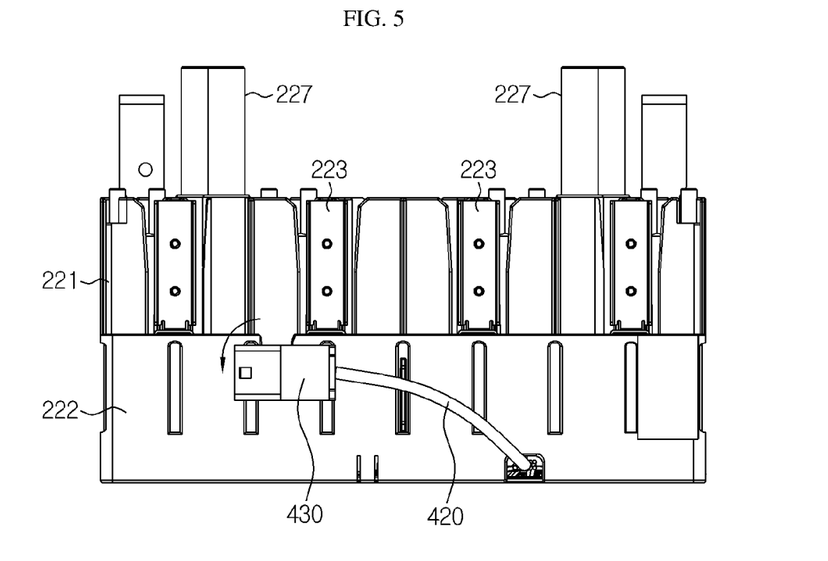

FIGS. 3 to 5 are diagrams showing states before and after the sensing connector 430 is mounted to the rear-side vertical plate 220 of the lower housing 200 according to an embodiment of the present disclosure.

Referring to FIGS. 3 to 5, the temporary connector fixing unit 224 may be formed by partially cutting the lower vertical plate 222 into a predetermined shape in a lower direction from the top of the lower vertical plate 222. In addition, an empty space S is present at the rear of the temporary connector fixing unit 224. The sensing connector 430 is vertically inserted into the temporary connector fixing unit 224, as shown in FIGS. 4 and 5, and may be fixed in vertical, lateral, and front and rear directions by being rotated at a certain angle.

Figure 6:
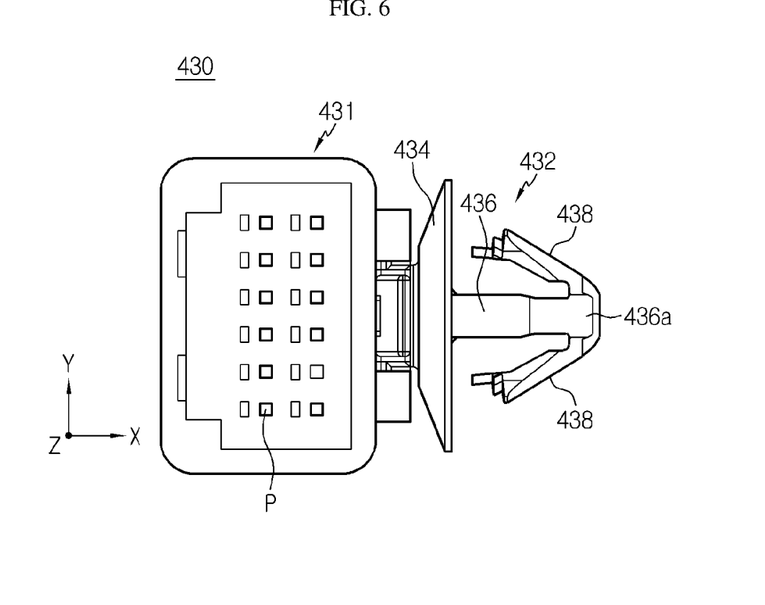
FIG. 6 is a top view showing the sensing connector according to an embodiment of the present disclosure, observed from a connection portion of sensing connector.
Figure 7:
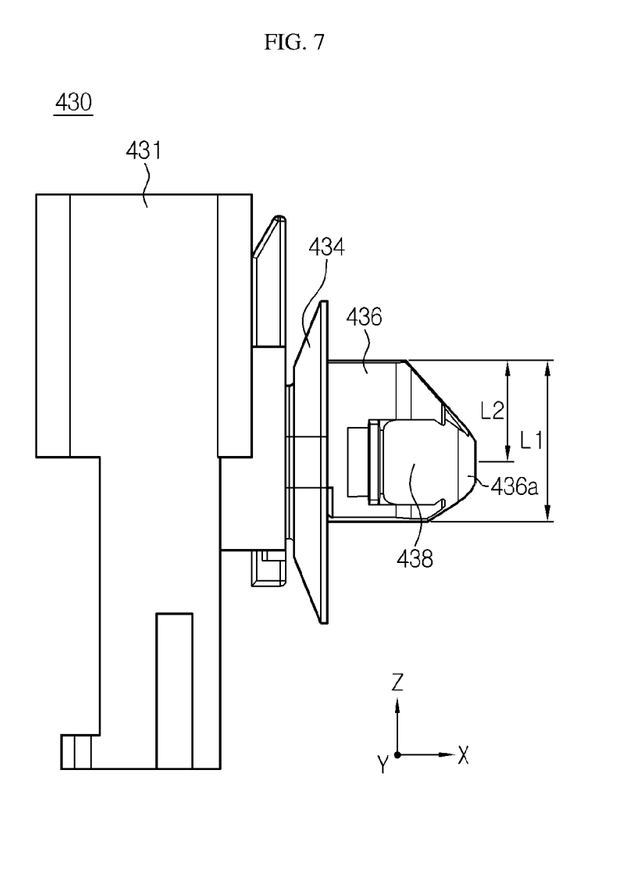
FIG. 7 is a side view of FIG. 6.
Figure 8:
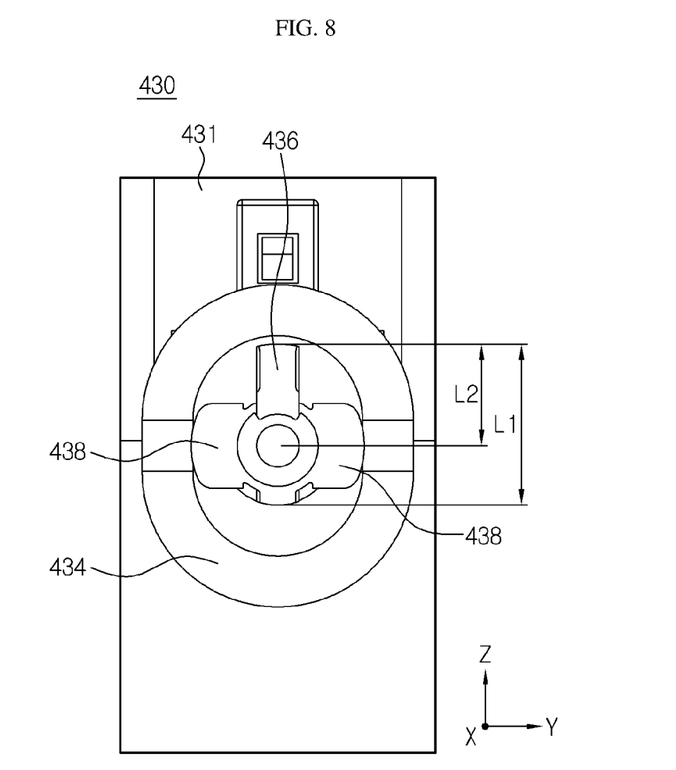
FIG. 8 is a front view of FIG. 6.
Figure 9:
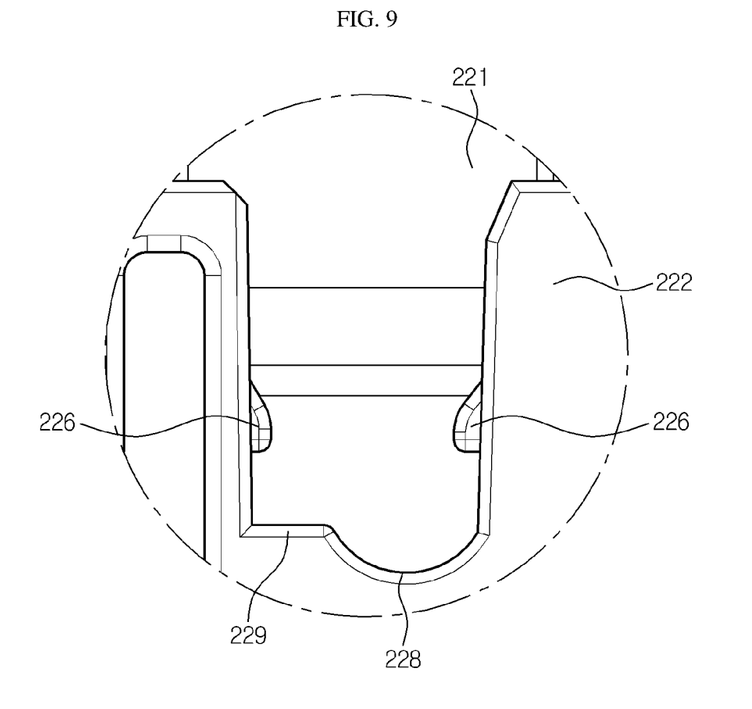
FIG. 9 is an enlarged view showing a portion A of FIG. 3.

FIG. 6 is a top view showing the sensing connector 430 according to an embodiment of the present disclosure, observed from a connection portion of sensing connector 430, FIG. 7 is a side view of FIG. 6, FIG. 8 is a front view of FIG. 6, FIG. 9 is an enlarged view showing a portion A of FIG. 3, and FIGS. 10 to 12 are diagrams for illustrating a process of mounting the sensing connector 430 according to an embodiment of the present disclosure, observed from the rear of the temporary connector fixing unit.

Referring to FIGS. 6 to 8, the sensing connector 430 according to the present disclosure includes a body 431 and a fixing hook 432. In this embodiment, the body 431 and the fixing hook 432 are provided to be detachable from each other, but they may also be provided in an integrated body.

The body 431 includes a plurality of connector pins P therein and is provided to be capable of being coupled to the end of the harness wire 420. In addition, the fixing hook 432 may be provided to be capable of being coupled to the outer surface of the body 431.

The fixing hook 432 may include a connecting portion 434, a hook body 436 and a wing portion 438. The connecting portion 434 may be integrally formed with the hook body 436 and the wing portion 438 and be provided to be detachable from the body 431. The hook body 436 may be provided to protrude vertically with respect to the outer surface of the body 431 and have a plate form with a predetermined thickness. A maximum width of the hook body 436 may approximately correspond to a width between both side surfaces of the temporary connector fixing unit 224. In addition, the hook body 436 may have a gradually decreased width to form a tip 436a. The wing portion 438 may have a wing form at an end of the hook body 436, namely at the tip 436a, to spread in both sides toward the body 431 while crossing in a width direction of the hook body 436.

The wing portion 438 may have elasticity. For example, the wing portion 438 may be folded when passing through a hole with a predetermined diameter, and may be spread again after passing through the hole. In other words, the wing portion 438 provided at the tip 436a of the hook body may be elastically transformed to pass through a hole of a specific size only in one direction.

In particular, referring to FIGS. 7 to 8, the lateral width of the hook body 436 may be asymmetrically narrowed based on its center so that the tip is biased to one side. In other words, as shown in the figures, if the maximum width of the hook body 436 is "L1", the tip of the hook body 436 may be formed at a location corresponding to "L2". In addition, at the tip of the hook body 436, the wing portion 438 is spread toward the body 431, and thus, if the connector hook is observed in an X-axis direction of FIG. 8, the wing portion 438 and the hook body 436 may be disposed to cross each other in an approximately inversed "T" shape.

Figure 10:
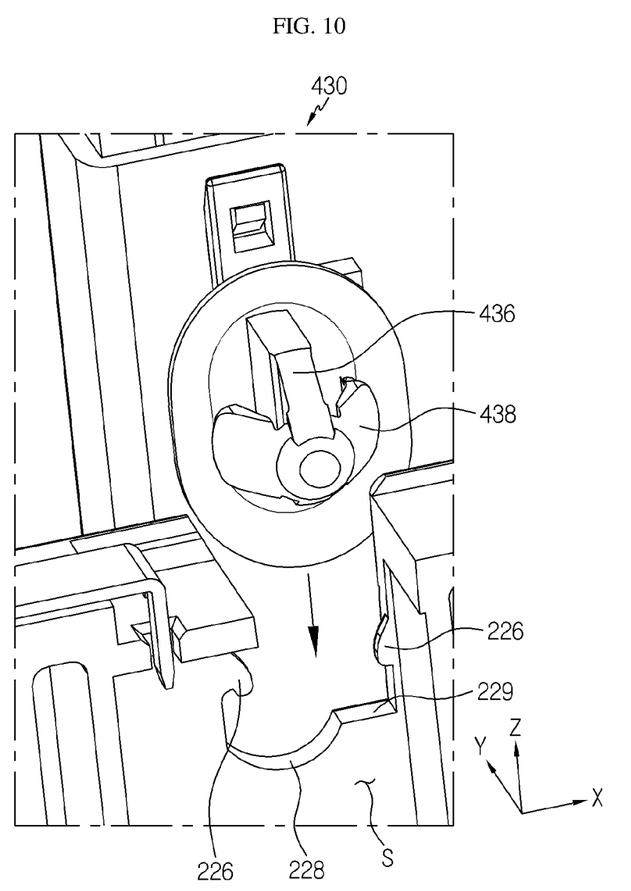
FIGS. 10 to 12 are diagrams for illustrating a process of mounting the sensing connector according to an embodiment of the present disclosure, observed from the rear of the temporary connector fixing unit.

Meanwhile, referring to FIGS. 9 and 10, the temporary connector fixing unit 224 includes a lower end portion having a curved region 228 of an arc form and both side surfaces respectively having hooking protrusions 226 protruding in a lateral direction toward the space formed by cutting. Here, the width between both side surfaces corresponds to the maximum width of the hook body 436.

The lower end portion of the temporary connector fixing unit 224 may include a linear region 229 together with the curved region 228. A length from the linear region 229 to the hooking protrusion 226 may be slightly longer than the length corresponding to the thickness of the hook body 436. In addition, the inside of the temporary connector fixing unit 224 is the empty space S in the lower vertical plate 222. Thus, as shown in FIG. 10, the sensing connector 430 may be provided to stand so that the connector hook is located in a lower direction from the upper portion of the temporary connector fixing unit 224. Here, the standing direction of the sensing connector 430 is identical to the standing direction (the vertical direction) of the hook body 436 of the connector hook.

Figure 11:
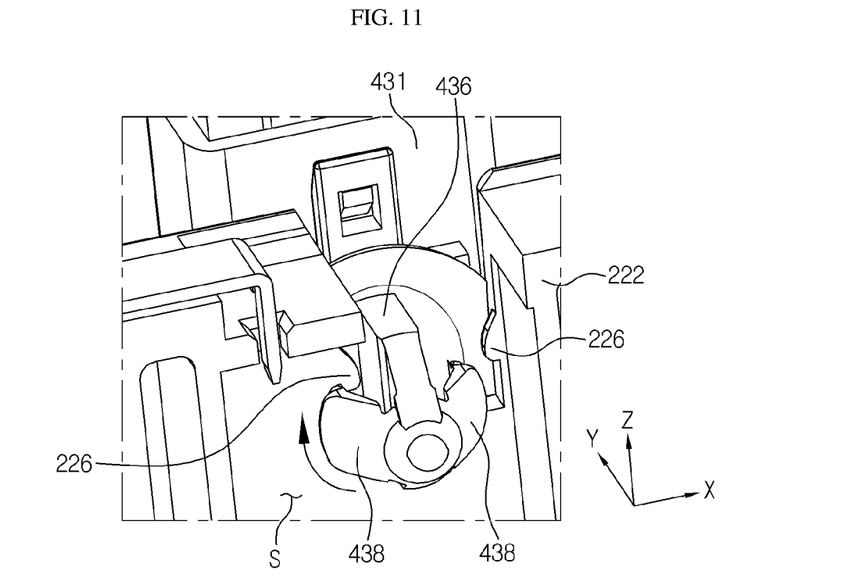
Figure 12:
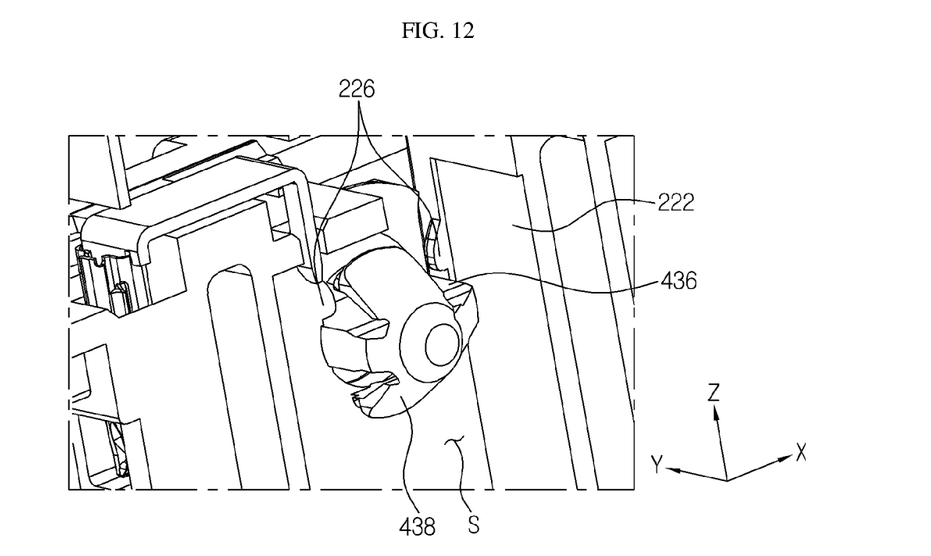

Referring to FIGS. 11 and 12, in the connector hook, the hook body 436 may be provided to stand with respect to the hooking protrusion 226 and be inserted into the temporary connector fixing unit 224 in a vertical direction, and may be rotated by 90 degrees in a clockwise direction in a state of being completely inserted. At this time, the hook body 436 may be guided to rotate along the curved region 228 of the lower end portion. If the hook body 436 rotates by 90 degrees, the hook body 436 becomes laid with respect to the hooking protrusion 226 and the linear region 229, and one side of the wing portion 438 is hooked below the lower end portion at the inside of the temporary connector fixing unit 224.

In this configuration, the hook body 436 of the sensing connector 430 may be restrained by the hooking protrusions 226 and fixed in a vertical direction (Z-axis direction), the wing portion 438 may be hooked below the lower end portion curved region 228 and fixed in a front and rear direction (Y-axis direction), and also both side portions of the hook body 436 forming the maximum width may be disposed in the space between both side surfaces of the temporary connector fixing unit 224 and fixed in a lateral direction (X-axis direction).

In particular, due to the asymmetrically crossing arrangement of the wing portion 438 and the hook body 436 of the connector hook and the shape characteristics of the hooking protrusions 226 of the temporary connector fixing unit 224 and the curved region 228 and the linear region 229 at the lower end portion corresponding thereto, in order to fix the connector hook to the temporary connector fixing unit 224, the connector hook should be rotated by applying a certain force in a clockwise direction (see FIG. 11).

When the sensing connector 430 is taken out from the temporary connector fixing unit 224, the mounting order is applied in a reverse way. In other words, the sensing connector 430 is rotated in a counterclockwise direction to stand upright and then is lifted upwards to be taken out therefrom.

Meanwhile, after the lower housing 200 and the upper housing 300 are assembled, the sensing connector 430 is detached from the temporary connector fixing unit 224, and then the vertical plate cover 230 is mounted to the upper vertical plate 221. After that, the sensing connector 430 may be fixed to the vertical plate cover 230 again.

Figure 13:
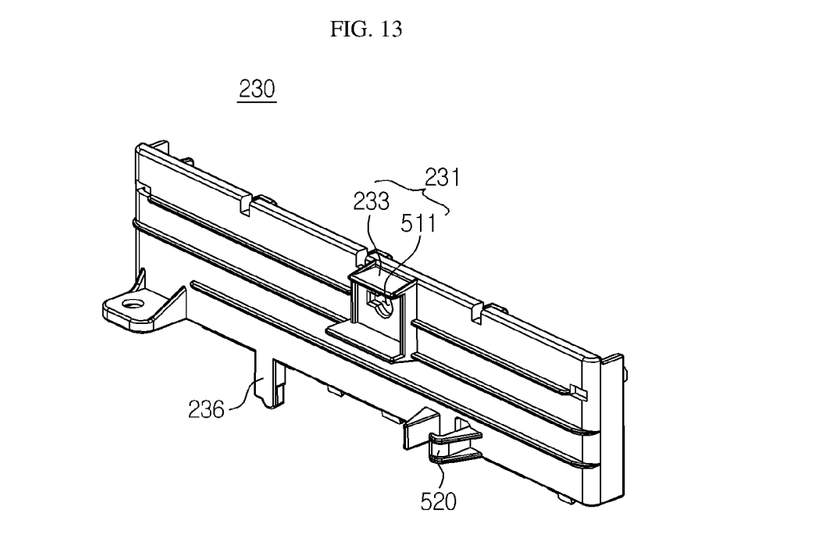
FIG. 13 is a perspective view showing a vertical plate cover according to an embodiment of the present disclosure.
Figure 14:
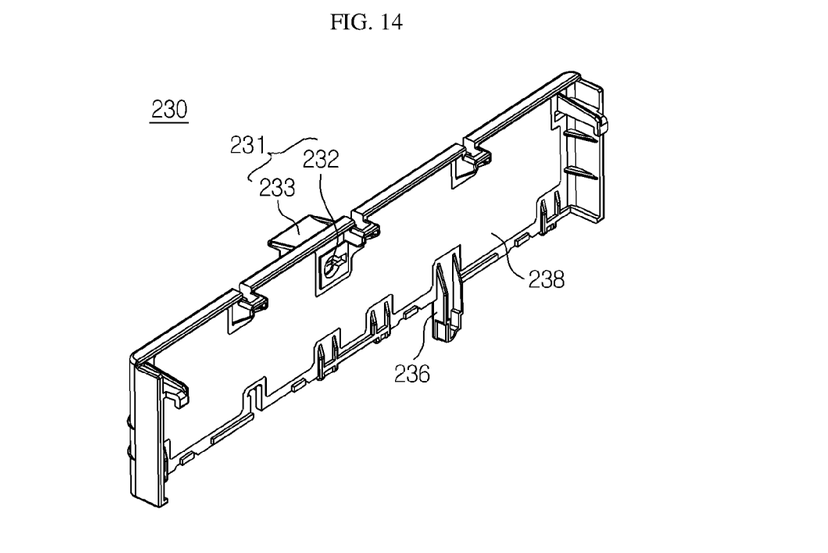
FIG. 14 is a perspective view showing the vertical plate cover of FIG. 13, observed from the rear side.
Figure 15:
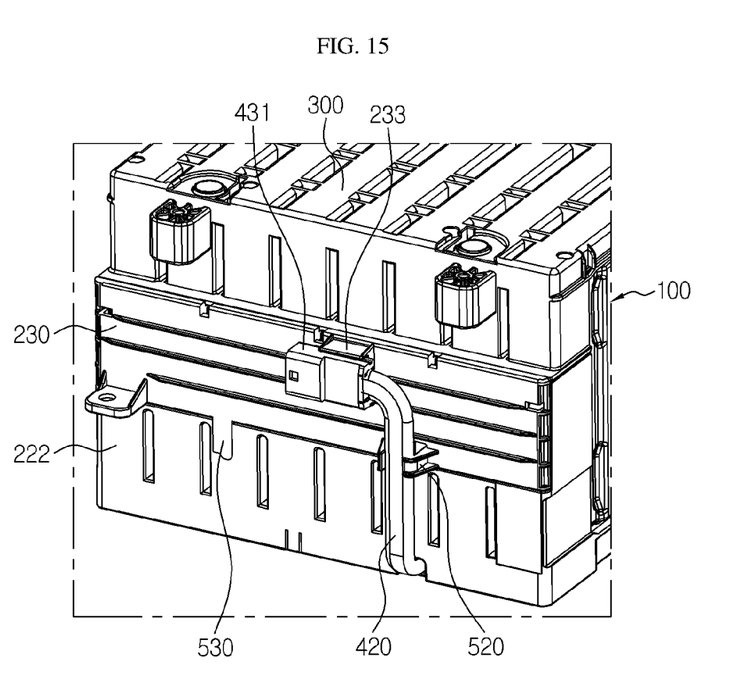
FIG. 15 is a partially enlarged perspective view showing a portion of the battery module according to an embodiment of the present disclosure in which the sensing connector is mounted to the vertical plate cover.

FIG. 13 is a perspective view showing the vertical plate cover 230 according to an embodiment of the present disclosure, FIG. 14 is a perspective view showing the vertical plate cover 230 of FIG. 13, observed from the rear side, and FIG. 15 is a partially enlarged perspective view showing a portion of the battery module 10 according to an embodiment of the present disclosure in which the sensing connector 430 is mounted to the vertical plate cover 230.

Referring to FIGS. 13 to 15, the vertical plate cover 230 may be provided to be capable of being assembled to the upper housing 300 and the lower vertical plate 222 in a snap-fitting manner in a plate form capable of entirely covering the upper vertical plate 221. The vertical plate cover 230 may include a leg portion 236 which fills the empty space of the lower vertical plate 222 from which the sensing connector 430 is detached, a connector fixing portion 231 to which the sensing connector 430 may be mounted, and a wire holder 234 for preventing the wire from moving.

The leg portion 236 may be shaped corresponding to the inner space of the temporary connector fixing unit 224 so as to be inserted into the temporary connector fixing unit 224 in a vertical direction and disposed therein.

The connector fixing portion 231 may further include an insert hole 232 formed at one side of the vertical plate cover 230 in a predetermined shape and a holder 233 for holding the connector body 431.

The insert hole 232 is provided so that its lateral width corresponds to the maximum width L1 of the hook body 436 and its vertical width allows the wing portion 438 to pass only in one direction. Thus, as shown in FIG. 15, the sensing connector 430 may be fixed to the vertical plate cover 230 by pushing the fixing hook 432 into the insert hole 232 in a front and rear direction in a horizontally laid state. Here, the wing portion 438 of the fixing hook 432 may be folded to pass through the insert hole 232 and be spread again in the vertical plate cover 230 after passing through the insert hole 232. Thus, the sensing connector 430 mounted to the vertical plate cover 230 is not taken out if it is pulled in an opposite direction.

The holder 233 for the connector body 431 is formed to protrude at the outer surface of the vertical plate cover 230, and the body 431 of the sensing connector 430 is fit into a space therebetween with the insert hole 232 being placed at the center. Thus, the sensing connector 430 may be restrained by the holder 233 for the connector body 431 in a state where the fixing hook 432 is inserted into the insert hole 232, and thus the sensing connector 430 may be restrained in a lateral direction.

The wire holder 234 is provided so that the harness wire 420 is fitted thereto below the connector fixing portion 231. In this case, together with the sensing connector 430, the harness wire 420 may also be closely adhered and fixed to the rear surface portion of the battery module 10.

As described above, the battery module 10 according to the present disclosure includes a structure for fixing the sensing connector 430 and thus may give convenience in assembling and ensure sufficient stability when the electrode tabs 111 of the battery cell 110 is welded or the lower housing 200 and the upper housing 300 are assembled in a state where the sensing connector 430 is temporarily fixed while the battery module 10 is being assembled.

In addition, since the sensing connector 430 is finally fixed to one side of the lower housing 200, the sensing connector 430 may be connected to a counterpart (a male connector) more stably and easily, and the harness wire 420 may be arranged neatly and clearly.

Meanwhile, a battery pack according to the present disclosure may include one or more battery modules 10 according to the present disclosure as described above. In addition, the battery pack may further include a case for covering the battery module 10 and various components for controlling charge/discharge of the battery module 10 such as BMS, a current sensor, a fuse or the like, in addition to the battery module 10.

The battery pack according to the present disclosure may be applied to an electric vehicle, a hybrid electric vehicle, a power storage device or the like.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or a shape in which an object is placed.

REFERENCE SIGNS

| | |
|---|---|
| 10: battery module | 100: cell assembly |
| 110: battery cell | 111: electrode tab |
| 120: cartridge | 200: lower housing |
| 210: lower plate | 220: vertical plate |
| 221: upper vertical plate | 222: lower vertical plate |
| 223: bus bar | 224: temporary connector fixing unit |
| 226: hooking protrusion | 228: curved region |
| 229: linear region | 230: vertical plate cover |
| 231: connector fixing portion | 232: insert hole |
| 233: connector body holder | 234: wire holder |
| 236: leg portion | 238: fragment anti-scattering sheet |
| 300: upper housing | 400: sensing unit |
| 410: sensing member | 420: harness wire |
| 430: sensing connector | 431: body |
| 432: fixing hook | 434: connecting portion |
| 436: hook body | 438: wing portion |
| 440: wire mold | |

What is claimed is:

1. A battery module, comprising:
a cell assembly having a plurality of battery cells arranged to be stacked on each other;
a lower housing having a lower plate provided in a plate form and two vertical plates extending vertically on the lower plate with a predetermined interval, the cell assembly being at least partially inserted into a space between the two vertical plates, so that a plurality of bus bars electrically connected to electrode tabs respectively provided at the battery cells are coupled to the vertical plates;
an upper housing coupled to the lower housing to surround an upper portion of the cell assembly; and
a sensing unit having a harness wire electrically connected to the plurality of bus bars and provided from a lower portion of the lower housing to an upper portion thereof and a sensing connector connected to an end of the harness wire and fixed at one side of the lower housing, the sensing unit being configured to sense a voltage characteristic of the battery cells,
a vertical plate cover configured to be attachable to one of the two vertical plates and configured to cover an upper portion of the one of the two vertical plates,
wherein the one of the two vertical plates includes a temporary connector fixing unit configured to temporarily fix the sensing connector to the one of the two vertical plates when the vertical plate cover is not attached to the one of the two vertical plates, and
wherein the vertical plate cover includes a connector fixing portion to which the sensing connector is mounted when the vertical plate cover is attached to the one of the two vertical plates.

2. The battery module according to claim 1,
wherein the one of the two vertical plates includes:
an upper vertical plate prepared so that the plurality of bus bars is capable of being coupled to an outer surface thereof; and
a lower vertical plate having an empty space therein and configured to extend downwards while protruding outwards in comparison to the upper vertical plate to form a step with respect to the upper vertical plate.

3. The battery module according to claim 2, wherein the temporary connector fix unit is configured to temporarily fixing the sensing connector to the lower vertical plate.

4. The battery module according to claim 3,
wherein the temporary connector fixing unit includes a hole defined in the lower vertical plate having a predetermined shape in a lower direction from a top of the lower vertical plate, and
wherein the sensing connector includes:
a body coupled to the end of the harness wire; and
a fixing hook coupled to an outer surface of the body and configured to be fixedly hooked to an inner side of the temporary connector fixing unit or be released therefrom by rotating the body at a predetermined angle so as to be mounted to the temporary connector fixing unit in a vertical direction.

5. The battery module according to claim 4,
wherein the temporary connector fixing unit includes a lower end portion having a curved region of an arc form and both side surfaces respectively having hooking protrusions protruding in a lateral direction toward the space formed by cutting, and
wherein the fixing hook includes a hook body configured to protrude vertically with respect to the outer surface of the body and having a plate form with a predetermined thickness and a wing portion provided in a wing form at an end of the hook body to spread toward the body while crossing the hook body, wherein the hook body stands between the hooking protrusions so that in a state where the hook body is inserted into the temporary connector fixing unit in a vertical direction, the hook body is laid by rotating along the curved region by 90 degrees to be restrained by the hooking protrusions in a vertical direction and restrained in a front and rear direction by the wing portion.

6. The battery module according to claim 2,
wherein the vertical plate cover is configured to cover the upper vertical plate and shield the plurality of bus bars.

7. The battery module according to claim 6,
wherein the connector fixing portion has an insert hole formed at one side of the vertical plate cover in a predetermined form,
wherein the sensing connector includes:
a body having a plurality of connector pins therein and prepared to be capable of being coupled to the end of the harness wire; and
a fixing hook having a hook body configured to protrude vertically with respect to an outer surface of the body and having a plate form with a predetermined thickness, and a wing portion provided in a wing form at an end of the hook body to spread toward the body while crossing the hook body,
wherein the wing portion is folded and passes through the insert hole and then is spread again after passing through the insert hole, so that the fixing hook is fixed to the vertical plate cover.

8. The battery module according to claim 7,
wherein the connector fixing portion further includes a connector body holder configured to protrude on an outer surface of the vertical plate cover and provided so that a body of the sensing connector is fit into a space therebetween with the insert hole being placed at the center.

9. The battery module according to claim 7,
wherein the vertical plate cover further includes a wire holder into which the harness wire is fit at a lower portion of the connector fixing portion.

10. The battery module according to claim 6,
wherein a fragment anti-scattering sheet is further attached to an inner surface of the vertical plate cover.

11. A battery pack, comprising the battery module defined in claim 1.

12. The battery module according to claim 1, wherein the connector fixing portion further includes two walls projecting from an outer surface of the vertical plate cover such that the insert hole is disposed between the walls, the two walls configured such that a body of the sensing connector is fit into a space between the two walls when the sensing connector is mounted to the vertical plate cover.

13. The battery module according to claim 1, wherein the vertical plate cover includes a leg projecting therefrom having a shape corresponding to an inner space of the temporary connecting fixing unit when the vertical plate cover is attached to the one of the two vertical plates.

* * * * *